(12) United States Patent
Piccolo

(10) Patent No.: US 8,353,733 B2
(45) Date of Patent: Jan. 15, 2013

(54) ELECTRIC CURRENT-GENERATING AND/OR ELECTRIC POWER-PLANT DEVICE ON-BOARD A SAILING STRUCTURE

(75) Inventor: Dino Piccolo, Le Teich (FR)

(73) Assignee: Nanni Industries, La Teste de Buch (FR)

( * ) Notice: Subject to any disclaimer, the term of this patent is extended or adjusted under 35 U.S.C. 154(b) by 307 days.

(21) Appl. No.: 12/879,388

(22) Filed: Sep. 10, 2010

(65) Prior Publication Data

US 2011/0057459 A1 Mar. 10, 2011

(30) Foreign Application Priority Data

Sep. 10, 2009 (FR) .................................... 09 56202

(51) Int. Cl.
*B06L 11/00* (2006.01)
(52) U.S. Cl. ................................ 440/3; 440/6; 290/1 R
(58) Field of Classification Search .................. 290/1 R; 440/3, 6
See application file for complete search history.

(56) References Cited

U.S. PATENT DOCUMENTS

| | | | | |
|---|---|---|---|---|
| 3,230,698 A * | 1/1966 | Nettles | ............................. | 60/718 |
| 3,619,632 A * | 11/1971 | Labombarde | ................... | 290/43 |
| 4,695,261 A * | 9/1987 | Broughton et al. | ......... | 440/61 R |
| 5,011,442 A * | 4/1991 | Polcz et al. | .................... | 440/113 |
| 5,722,360 A * | 3/1998 | Tsunoda et al. | ........... | 123/195 P |
| 6,570,281 B2 * | 5/2003 | Kashima et al. | ................ | 310/74 |
| 7,147,523 B2 * | 12/2006 | Mori et al. | ......................... | 440/3 |
| 7,314,396 B2 * | 1/2008 | Kubota et al. | ................... | 440/83 |
| 7,662,003 B2 * | 2/2010 | Luca | ................................. | 440/6 |
| 7,862,393 B2 * | 1/2011 | Levander et al. | ................. | 440/3 |
| 2007/0184728 A1 | 8/2007 | Kennedy | | |
| 2007/0202755 A1 | 8/2007 | Ichikawa et al. | | |

FOREIGN PATENT DOCUMENTS

| | | |
|---|---|---|
| DE | 10148785 A1 * | 6/2002 |
| EP | 1426288 A1 | 6/2004 |
| EP | 1669287 A1 | 6/2006 |
| EP | 1806284 A1 | 7/2007 |
| JP | 06129257 A * | 5/1994 |
| WO | 9922955 A1 | 5/1999 |
| WO | WO 2005032935 A1 * | 4/2005 |
| WO | 2007075148 A1 | 7/2007 |

OTHER PUBLICATIONS

International Search Report, dated Jun. 16, 2009, from corresponding French application.

* cited by examiner

*Primary Examiner* — Joseph Waks
(74) *Attorney, Agent, or Firm* — Young & Thompson

(57) ABSTRACT

The object of the invention is an electric current-generating and/or electric power-plant device (50) in a sailing structure comprising at least one power plant and at least one battery pool, whereby said power plant comprises at least one heat engine (18), a reducer/inverter assembly, and particularly a shaft line (22) equipped with at least one propeller at its end, with the current-generating device (50) being inserted between the flange (66) of the engine cover (68) of said engine (18) and the flange (70) of the reducer/inverter assembly (20), where said device (50) is characterized in that it takes the form of a closed module (64) that can be inserted directly between the flange (66) of the engine cover (68) and the flange (70) of the reducer/inverter assembly without disassembly, total or partial, of its components.

11 Claims, 7 Drawing Sheets

ELECTRIC CURRENT-GENERATING AND/OR ELECTRIC POWER-PLANT DEVICE ON-BOARD A SAILING STRUCTURE

This invention relates to an electric current-generating and/or electric power-plant device in a sailing structure.

In sailing, and more specifically in pleasure sailing, there are many kinds of electric equipment: onboard electronics, galley equipped with microwave oven and refrigerator, television, pressurized water, air-conditioning, and other deck equipment, and for the majority of pleasure sailing units, comfort has become an essential criterion of selection.

In a sailing structure that can be propelled by at least one heat engine, regardless of its size, said power plant is equipped with at least one alternator that allows the charging of an engine battery pool used for the engine functions and particularly for starting.

This battery pool is rarely sized for services and comfort.

Moreover, since the engine is an essential or safety component of a sailing structure, it has appeared necessary to separate the battery pool into an engine battery pool and a services battery pool.

The services battery pool generally has a high capacity for electric energy storage, but since the electrical devices are becoming increasingly numerous and sophisticated, it is advisable to be able to recharge these batteries.

Several devices of the prior art meet this requirement.

A known device of the prior art is described in European Patent Application EP-1,806,284 from the same applicant.

Thus, this document EP-1,806,284 relates to an electric current-generating and/or electric power-plant device in a sailing structure, as does this invention.

Figure 1:
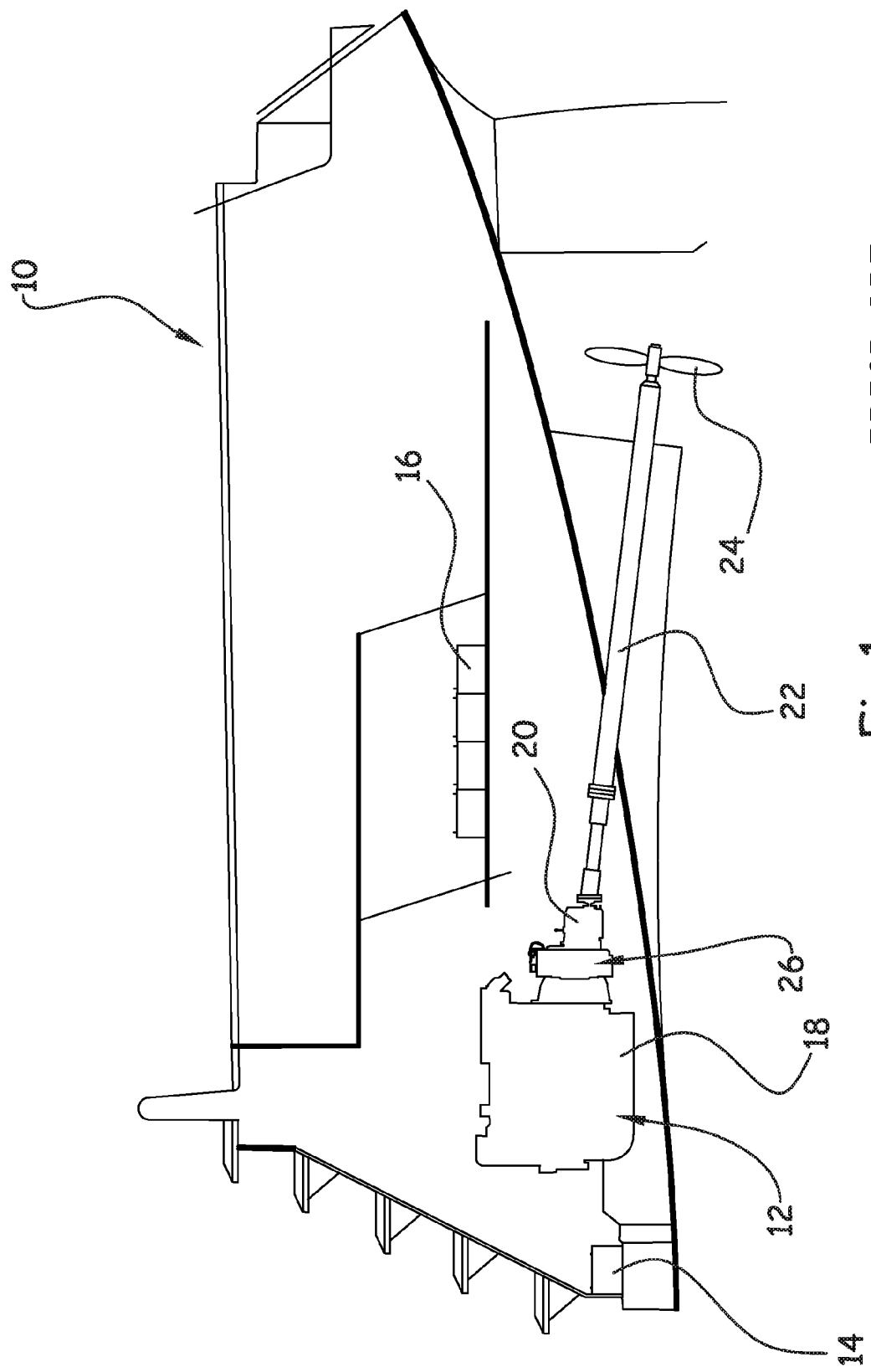

As illustrated in FIG. 1, a sailing structure 10 comprises at least one power plant 12, an engine battery pool 14, and a services battery pool 16. Said power plant 12 comprises at least one heat engine 18, one reducer/inverter assembly 20, and one shaft line 22 equipped with a screw propeller 24 at its end.

According to this document EP-1,806,284, the current-generating device 26 is fitted between the engine 18 and the reducer/inverter assembly 20, where the engine 18 and the unit 20 are themselves made integral with the supports provided for this purpose in the hull of the sailing structure.

Figure 2:
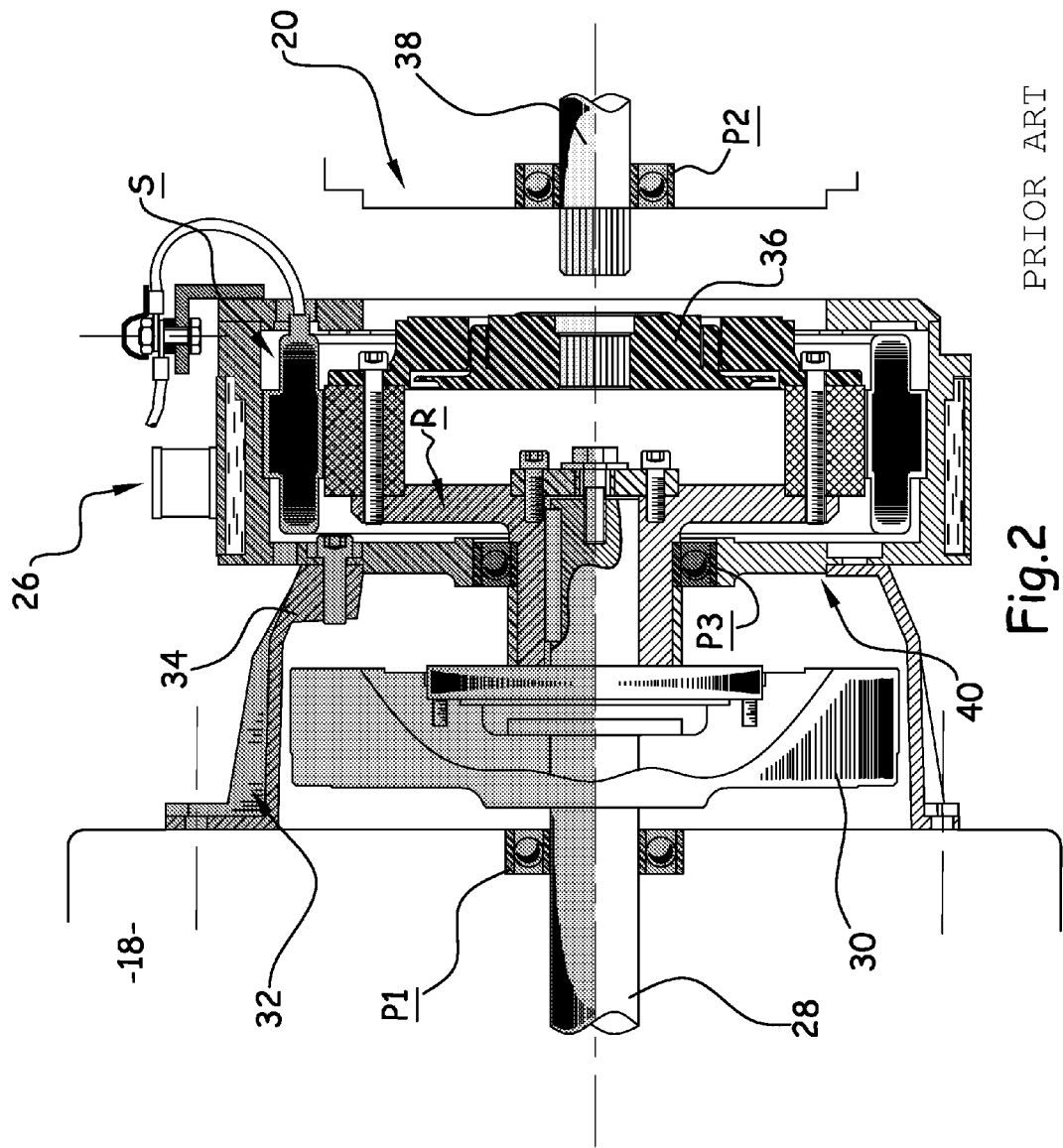

As depicted in FIG. 2, upstream from the current-generating device 26, the engine manufacturers provide engine blocks with a driving shaft 28 mounted on a bearing P1 and carrying a flywheel 30, with this flywheel being placed in a cover 32 attached to the engine block and having a flange 34, where everything is standardized.

Coming out from the current-generating device 26, an elastic connection 36 is provided, said flector is also standardized, so as to receive the driven shaft 38, mounted on a bearing P2, of the reducer/inverter assembly 20.

This current-generating device 26 of the prior art is therefore inserted directly between the driving shaft 28 of the engine 18 and the driven shaft 38 of the reducer/inverter assembly 20 with a longitudinal displacement provided between the two elements, generally a displacement of the engine 18 toward the front of the sailing structure of 150 to 200 mm to provide an order of magnitude.

To generate a current to supply a battery pool, said generating device 26 comprises a housing 40 connected to the flange 34 of the cover 32 of the engine block, a stator S integral with this housing 40 and a rotor R connected to the driving shaft 28, mounted on a bearing P3 arranged in said housing 40.

According to a first drawback, the design of this current-generating device 26 does not offer sufficient assembly precision. Actually, the bearings P1, P2 and P3 are each mounted separately in a distinct part of said power plant, namely respectively in the engine block, in the reducer/inverter assembly 20, and in the housing 40.

These distinct parts most often come from different manufacturers, and as a consequence, the manufacturing tolerances vary from one part to the next, and the very wide dimensions cause a loss of strength on the part of the entire assembly.

Finally, the design of this current-generating device 26 is detrimental to the strength of the assembly between the stator S and the rotor R, and therefore to the maintenance of a constant gap between these two elements.

On the other hand, this document EP-1,806,284 also calls for a use of the current-generating device 26 as an electric motor.

For this mode of operation, means for coupling/uncoupling the engine drive, known as a clutch, are necessary to lock or unlock, in drive, the driving shaft 28 and the rotor R.

This document EP-1,806,284 therefore calls for inserting this clutch between the driving shaft 28 and the rotor R of the generating device 26, more specifically at the level of the flywheel 30 in the cover 32.

Knowing that manufacturers provide engine blocks with a flywheel 30 in a cover 32, both standardized, a retooling of the flywheel 30 is sometimes necessary for the installation of said clutch, or else the development of a specific shaft, attached to the flywheel 30, is essential to be able to adapt said clutch.

As is set forth in this document EP-1,806,284, the insertion of the clutch makes it more difficult to adapt the current-generating device to an engine block, increases the number of hours of necessary labor, and hinders the retail sale of said current-generating device.

Finally, for use on sailing structures with increasing amounts of electric equipment for comfort, it is found that the current-generating device 26 according to this document EP-1,806,284 provides an increasingly limited range.

Also, this invention aims to remedy the drawbacks of the prior art by proposing a current-generating device whose design offers a strength and an increased assembly precision between the rotor and the stator, a kind of installation that is easy and that can permit a greater range from a battery pool.

For this purpose, the object of the invention is an electric current-generating and/or electric power-plant device in a sailing structure comprising at least one power plant and at least one battery pool, whereby said power plant comprises at least one heat engine, one reducer/inverter assembly possibly integrated into a Saildrive-, Sterndrive- or turbine-type power train, and particularly a shaft line equipped with at least one propeller at its end, with the current-generating device being inserted between the flange of the engine cover of said engine and the flange of the reducer/inverter assembly, whereby said device is characterized in that it takes the form of a closed module that can be inserted directly between the flange of the engine cover and the flange of the reducer/inverter assembly without disassembly, total or partial, of its components.

Figure 3:
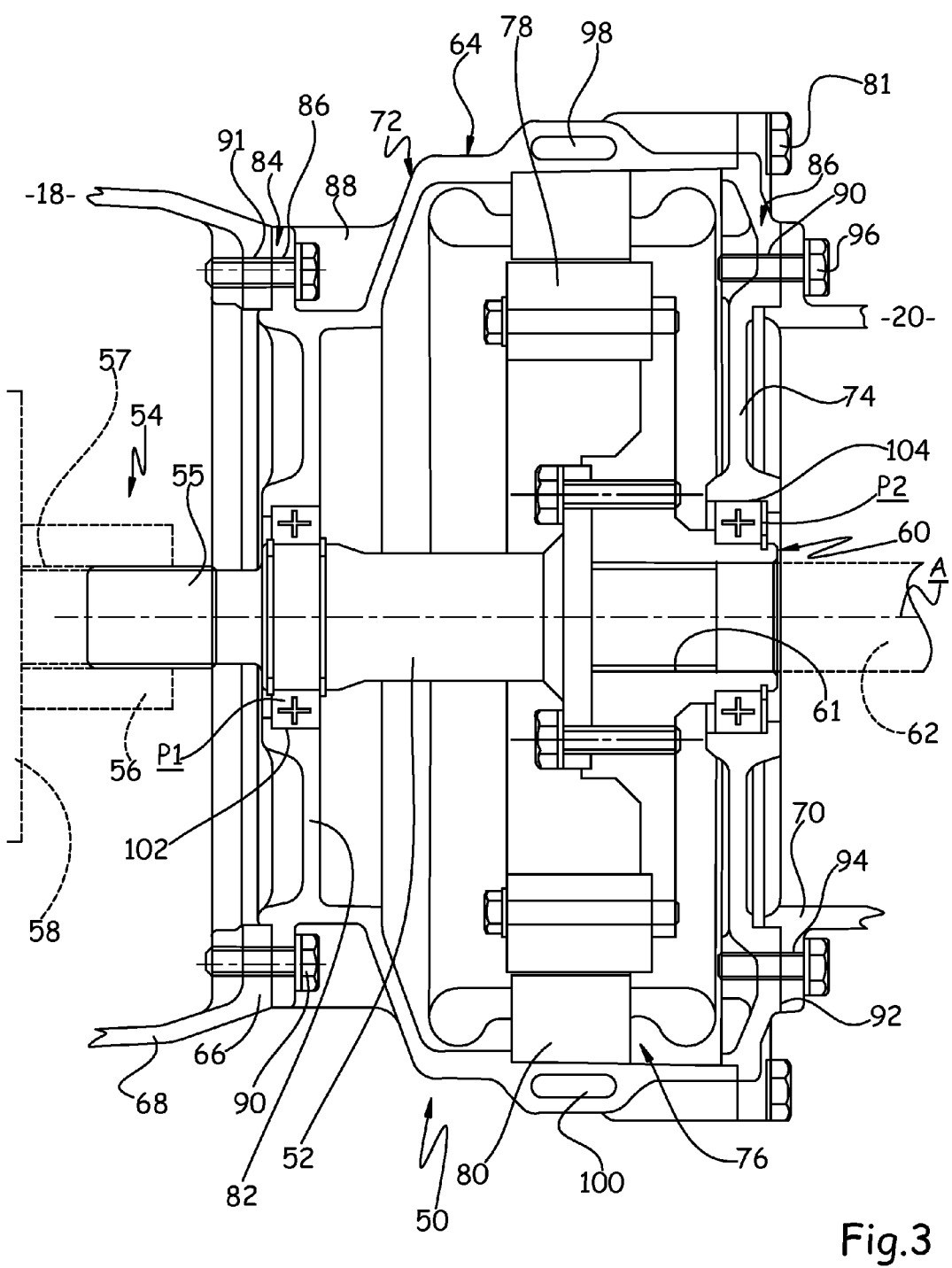
Figure 4:
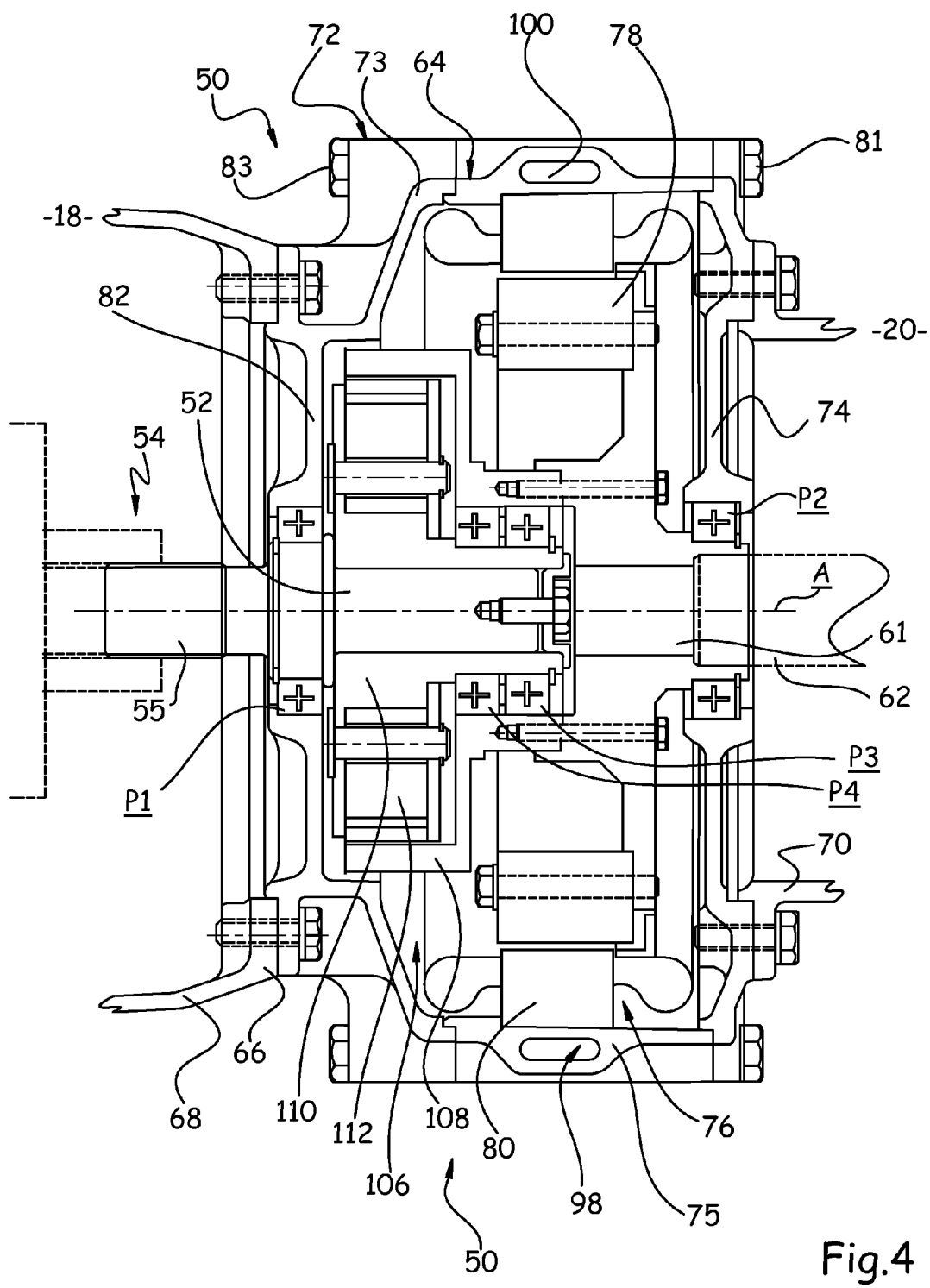
Figure 5:
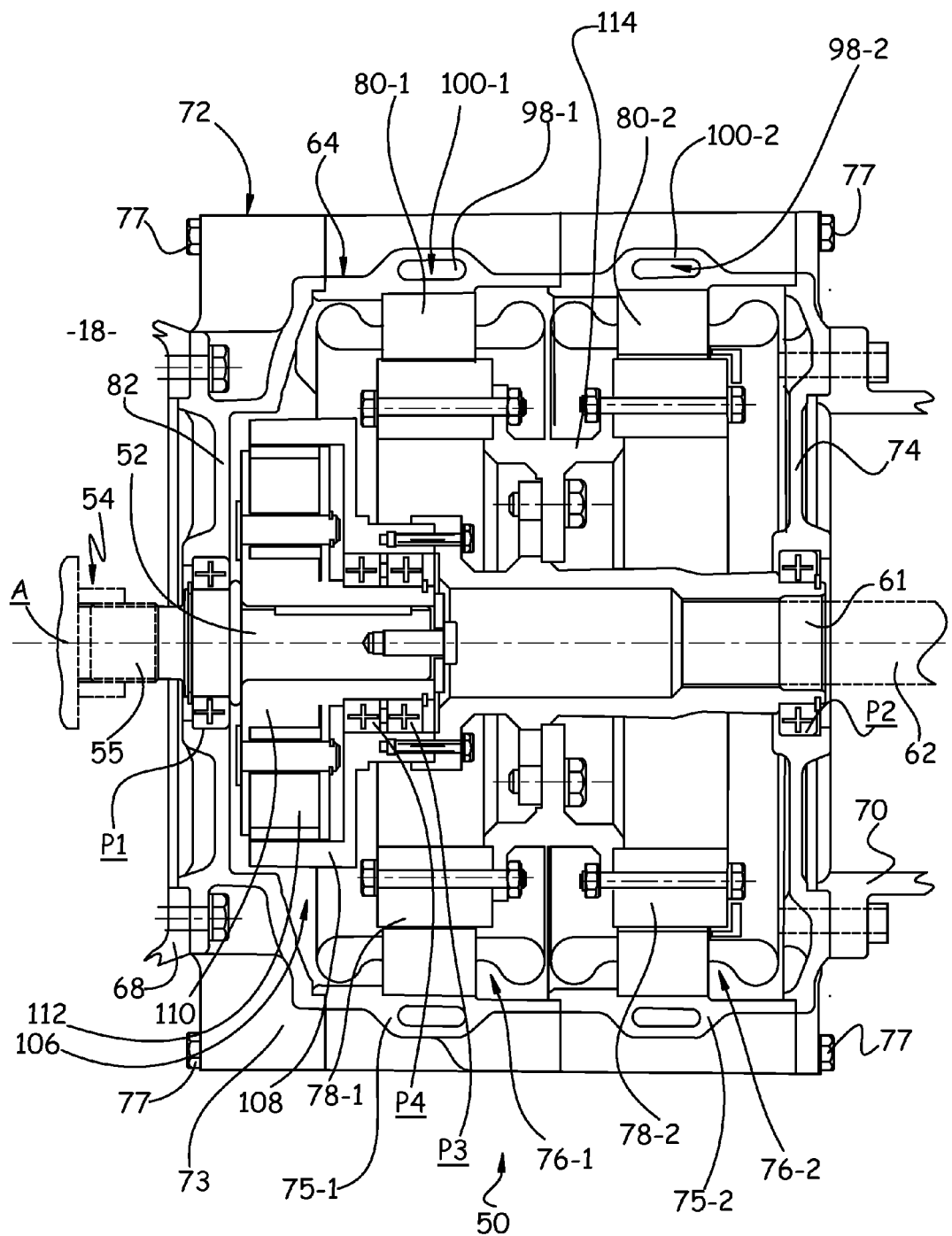
Figure 6:
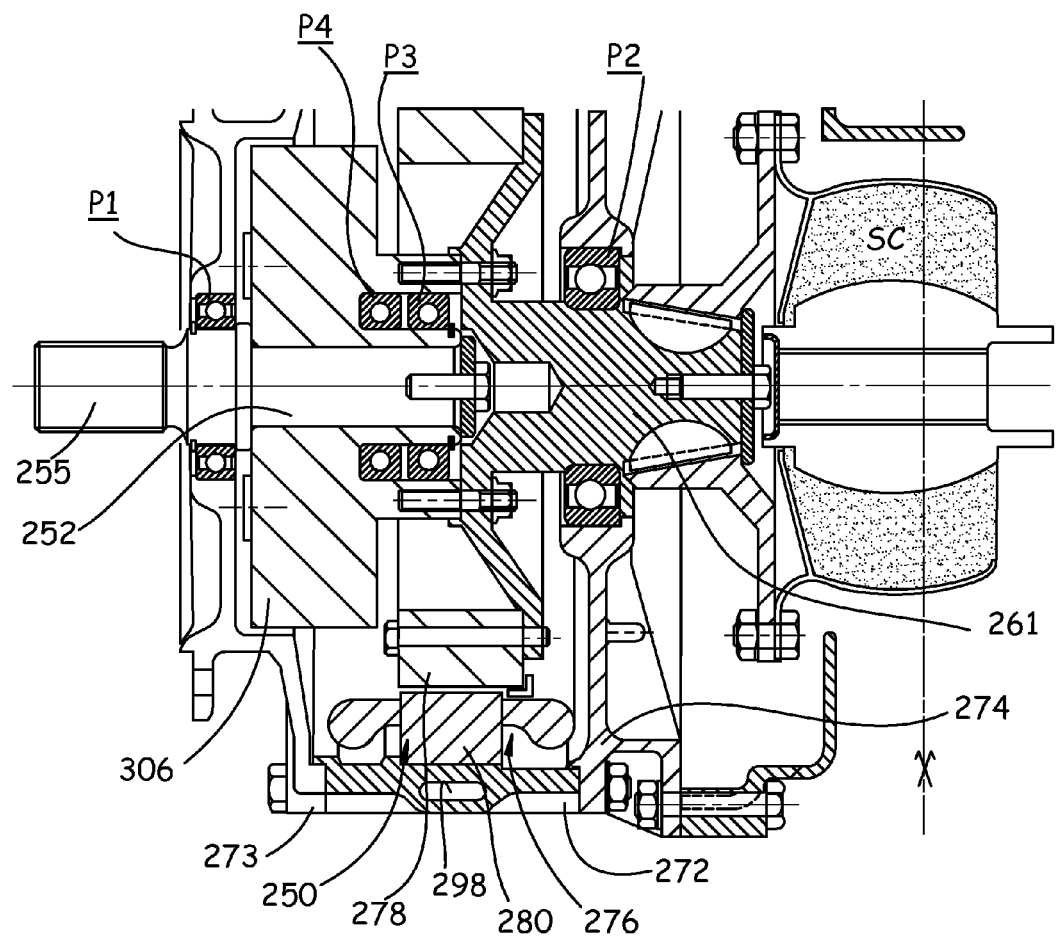
Figure 7:
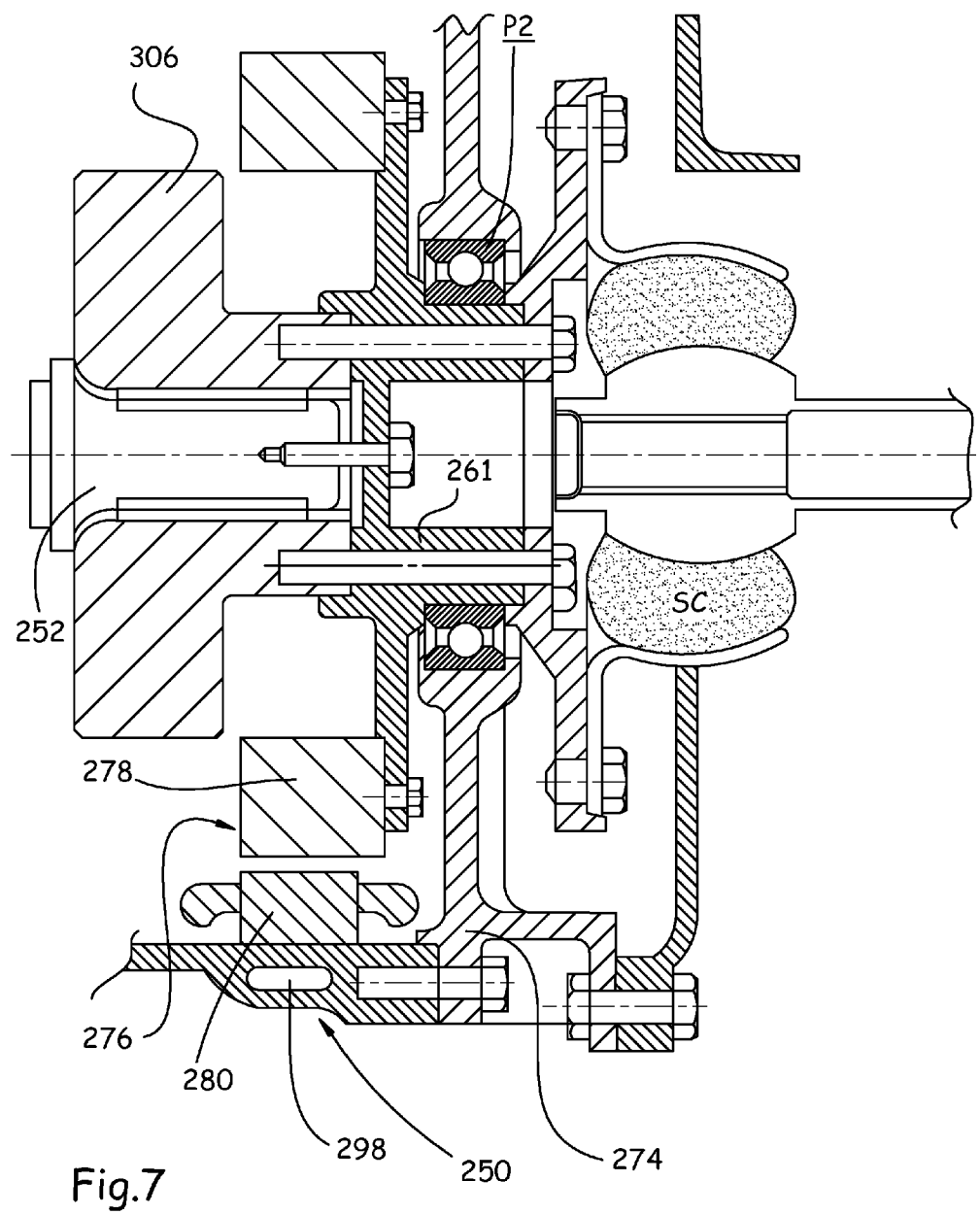

Other characteristics and advantages will become clear from the following description of the invention, a description that is given only by way of example, with regard to the accompanying drawings, where:

FIG. 1 is a view of an electric current-generating and/or electric power-plant device in a sailing structure according to the prior art, FIG. 2 is a view in section of an electric current-generating and/or electric power-plant device according to the prior art, FIG. 3 is a view in section of a first embodiment of an electric current-generating and/or electric power-plant device according to the invention, in this case applied to a shaft line, FIG. 4 is a view in section of a second embodiment of an electric current-generating and/or electric power-plant device according to the invention, FIG. 5 is a view in section of a third embodiment of an electric current-generating and/or electric power-plant device according to the invention, FIG. 6 is a view showing the same characteristics as FIGS. 3, 4 and 5, but designed for a Stern Drive assembly, FIG. 7 is a variant of the design for a Stern Drive assembly of FIG. 1, further simplified, with certain unnecessary elements having been taken out of the figure.

The invention has as its object an electric current-generating and/or electric power-plant device for a sailing structure.

As described in the introductory clause and illustrated in FIG. 1, a sailing structure 10 comprises at least one power plant 12, one engine battery pool 14, and one services battery pool 16.

Said power plant 12 comprises at least one heat engine (18), one reducer/inverter assembly 20, a shaft line 22 equipped with at least one propeller 24 at its end, with the reducer/inverter assembly 20 being possibly integrated into a Saildrive-, Sterndrive- or turbine-type power train as described above in the description.

Just like the device 26 of the prior art described previously, and as illustrated in FIG. 3, the current-generating device 50 according to the invention is inserted between the engine 18 and the reducer/inverter assembly 20, whereby the engine 18 and the unit 20 are themselves made integral with the hull of the sailing structure 10 by supports provided for this purpose.

The assembly of the current-generating device 50 is performed by shifting the engine 18 and its supports, or by shortening the shaft line 22.

The device 50 comprises at least one input shaft 52, engine 18 side, equipped with coupling means 54 with the inertia flywheel 58 of said engine 18, or an output shaft 56, and means 60 for linking to the input shaft 62 of the reducer/inverter assembly 20.

Preferably, the input shaft 52 and the linking means 60 have the same central axis A around which the device 50 according to the invention is designed, whereby said central axis A of the device 50 is approximately coaxial to the central axis of the inertia flywheel 58, or of the output shaft 56, of the engine 18, and to the central axis of the input shaft 62 of the reducer/inverter assembly 20.

To be easily inserted between the engine 18 and the reducer/inverter assembly 20, the device 50 according to the invention takes the form of a closed module 64 that is directly adaptable and able to be inserted between the flange 66 of the engine cover 68 and the flange 70 of the reducer/inverter assembly 20 without disassembly, total or partial, of certain of its components.

For this purpose and preferably, the coupling means 54, particularly a flector-type flexible coupling, with the inertia flywheel 58 of said engine 18, or the output shaft 56, are made up of a splined shaft 55 that is integral with the input shaft 52, of shapes and dimensions adapted to a splined hub 57, particularly standardized, of the inertia flywheel 58, or of the output shaft 56, of said engine 18.

Moreover, the means 60 for linking with the input shaft 62 of the reducer/inverter assembly 20 consist of a splined hub 61 of shapes and dimensions adapted to the input shaft 62, particularly standardized.

Then, said module 64 comprises at least one casing 72 and one rear plate 74 enclosing at least one generator unit 76 made up of a rotor 78 and a stator 80, whereby said rear plate 74 is attached and is made integral with the casing 72 by fastening screws 81, or any other known interlocking element, during the factory assembly of said module 64.

Said stator 80 is integral with the casing 72, and the rotor 78 is connected to the input shaft 52 and to the splined hub 61 of the means 60 for linking to the reducer/inverter assembly 20.

In a known way, a fixed gap is maintained between the stator 80 and the rotor 78 by means of designs described below.

To ensure easy insertion of the module 64, the seat 82 of the casing 72 comprises means 84 for fastening on the flange 66 of the engine cover 68, particularly of standardized dimensions, and the rear plate 74 comprises means 86 for receiving the reducer/inverter assembly 20.

Advantageously, fastening means 84 are accessible from the outside of the module 64 and take the form of bores 86 that are made in the seat 82 of the casing 72.

Said bores 86 are distributed according to a design adapted to the flange 66 of the engine cover 68, with said design being particularly standardized, and are located in an exterior groove 88 that comes from the factory with the casing 72, permitting access to said bores 86 for the passage and the tightening of fastening screws 90, or any other known interlocking element, in bores 91, particularly threaded, provided at the level of the flange 66 of the engine cover 68.

Likewise, means 86 for receiving the rear plate 74 are adapted to the design of the fastening flange 70, particularly standardized, of the reducer/inverter assembly 20, and these receiving means 86 take the form of bores 90, preferably threaded, distributed according to the design, particularly standardized, of the fastening flange 70 of the reducer/inverter assembly 20.

More precisely, said bores 90 of the rear plate 74 are distributed on a collar 92 on which the flange 70 of the reducer/inverter assembly 20 rests, whereby said flange 70 also comprises bores 94 for the passage and the tightening from the outside of fastening screws 96, or of any other known interlocking element.

It is therefore found that the module 64 according to the invention is inserted, or removed, very quickly and simply between the engine 18 and the reducer/inverter assembly 20.

To make maximum use of the electric-energy-producing capacities of the generator unit 76, a cooling circuit 98 surrounding the stator 80 is integrated into the casing 72.

Preferably, said cooling circuit 98 consists of at least one channel 100 that comes from the factory with the casing 72, particularly by molding, and connected, either directly to the untreated water circuit of the engine, or to any type of heat exchanger that is known and used in a sailing structure.

To ensure optimum strength of the assembly and the maintenance of a fixed gap between the stator 80 and the rotor 78, said input shaft 52 is supported and guided in rotation by a bearing P1, whereby said bearing P1 is mounted in a housing 102 provided for this purpose in the center of the seat 82 of the casing 72, and the splined hub 61 of the linking means 60 is supported and guided in rotation by a bearing P2, whereby said bearing P2 is mounted in a housing 104 provided for this purpose in the center of the rear plate 74.

Said bearings P1 and P2 are kept in place in translation along axis A on the input shaft 52 and on the splined hub 61 by a shoulder and/or elastic rings, and the housings 102 and 104 block respectively the translation of the bearings P1 and P2 along the axis A in at least one direction, preferably toward the outside.

According to a variant embodiment of the module 64, illustrated in FIGS. 4 and 5, the casing 72 is formed by a front plate 73 that is integral with a brace 75.

Said front plate 73 forms the seat 82 of the casing 72 that comprises fastening means 84 on the flange 66 of the engine cover 68, the brace 75 integrates the cooling circuit 98 consisting of at least one channel 100, and fastening screws 83 are used for interlocking said front plate 73 with the brace 75.

This variant advantageously makes it possible to standardize the brace 75 of the casing 72 for the various embodiments of the module 64 described below, but also to replace the front plate 73 easily to adapt it to a different standard.

Different embodiments of the module 64 of the current-generating device 50 according to the invention will now be described in a non-limiting way.

According to a first embodiment illustrated in FIG. 3, allowing a simple operation in generator mode of the device 50 according to the invention, the rotor 78 is connected securely, particularly by screws, to the input shaft 52 and to the splined hub 61 of the linking means 60.

To give an idea of the order of magnitude involved, in this first embodiment, the insertion of the module 64 requires a shifting of the engine 18 or a shortening of the shaft line 22, considerably less than two hundred millimeters.

According to a second embodiment illustrated in FIG. 4, allowing an operation in generator mode or in electric power-plant mode of the device 50 according to the invention, the rotor 78 is connected securely, particularly by screws, to the splined hub 61 of the linking means 60, and coupled to the input shaft 52 by a clutch 106 integrated into the module 64 according to the invention.

More precisely, this clutch 106 is of the centrifugal type and comprises at least one clutch cover 108 connected securely to the rotor 78 and to the splined hub 61, whereby a hub 110 carries flyweights 112 connected securely to the input shaft 52, and the bearings P3 and P4 ensure the support and the guiding in rotation of said cover 108 in relation to the flyweight-holding hub 110.

Thus, said clutch 106 makes it possible to couple/uncouple the rotor 78 from the input shaft 52 driven by the heat engine 18 to allow several uses of the generator unit 76.

According to a first use of the generator unit 76, when said clutch 106 couples the rotor 78 and the input shaft 52, the generator unit 76 is used as a current generator driven by the heat engine.

According to a second use of the generator unit 76, when said clutch uncouples the rotor 78 and the input shaft 52, the generator unit 76 can be used as an electric motor.

And finally, according to a third use of the generator unit 76, when said clutch uncouples the rotor 78 and the input shaft 52, and when the sailing structure has another means of propulsion, particularly in the case of a sailboat sailing under sail, the propeller can make it possible to drive the reducer/inverter assembly 20, with the input shaft 62 of the reducer/inverter assembly 20 becoming the motor and driving the hub 61 and therefore the rotor 78 to produce the electric energy.

To give an idea of the order of magnitude involved, in this second embodiment, the insertion of the module 64 makes it necessary to move the engine 18, or to shorten the shaft line 22, still considerably less than two hundred millimeters.

According to a third embodiment illustrated in FIG. 5, allowing the device 50 according to the invention to operate in generator mode or in electric power-plant mode, the module 64 encloses two generator units 76-1, 76-2, each composed of a rotor 78-1, 78-2 and a stator 80-1, 80-2.

Said module 64 comprises the casing 72 composed of the front plate 73, two braces (75-1, 75-2) and the rear plate 74, with the second brace 75-2 extending said casing.

Said braces (75-1, 75-2), as well as said front plate 73 and said rear plate 74, are interlocked by fastening screws 77, or any other known interlocking element, during the factory assembly of said module 64.

The stator 80-1 is integral with the brace 75-1, the stator 80-2 is integral with the brace 75-2, and the rotors 78-1 and 78-2 are connected securely to the splined hub 61 of the linking means 60 by an intermediate part 114 and fastening screws, or any other known interlocking element.

Advantageously, the braces (75-1, 75-2) each integrate a cooling circuit (98-1, 98-2) consisting of at least one channel (100-1, 100-2), particularly connected to and surrounding the stators (80-1, 80-2).

The rotors 78-1 and 78-2 are coupled to the input shaft 52 by the clutch 106 that is integrated into the module 64 according to the invention.

The clutch cover 108 is connected securely to the rotors 78-1 and 78-2 and to the splined hub 61, the hub 110 carrying the flyweights 112 is connected securely to the input shaft 52, and the bearings P3 and P4 ensure the support and the guiding in rotation of said cover 108 in relation to the flyweight-holding hub 110.

Thus, said clutch 106 makes it possible to couple/uncouple the rotors 78-1 and 78-2 of the input shaft 52 driven by the heat engine 18 to allow multiple uses of the two generator units 76-1, 76-2.

According to a first use of the two generator units 76-1, 76-2, when said clutch 106 couples the rotors 78-1 and 78-2 and the input shaft 52, the two generator units 76-1, 76-2 are used as a current generator driven by the heat engine.

According to a second use of the two generator units 76-1, 76-2, when said clutch uncouples the rotors 78-1 and 78-2 and the input shaft 52, the two generator units 76-1, 76-2 can be used as an electric motor.

And finally, according to a third use of the two generator units 76-1, 76-2, when said clutch uncouples the rotors 78-1 and 78-2 and the input shaft 52, and when the sailing structure has another means of propulsion, particularly in the case of a sailboat sailing under sail, the propeller can make it possible to drive the reducer/inverter assembly 20, with the input shaft 62 of the reducer/inverter assembly 20 becoming a motor and driving the hub 61 and therefore the rotors 78-1 and 78-2 to produce electric energy.

Advantageously, when they are used as a current generator, the two generator units 76-1, 76-2 can supply the same battery pool, or else supply two different battery pools by furnishing each one with the same or different voltages.

Moreover, this third embodiment of the module 64 takes the same components as the first two embodiments, with the exception of the hub 61 and a few screws. This standardization is particularly advantageous in terms of development and production costs of a range of products.

To give an idea of the order of magnitude involved, in this third embodiment, the insertion of the module 64 makes it necessary to move the engine 18, or to shorten the shaft line 22, considerably less than three hundred millimeters.

It is therefore found that, regardless of the embodiment, the module 64 of the device 50 according to the invention is compact, while integrating a clutch or a double current generator, and comes in the form of a block ready to be mounted or sold separately.

Of course, the device 50 according to the invention can be adapted to any type of propulsion other than a direct shaft line 22 with a propeller 24 at its end.

Thus, FIGS. 6 and 7 respectively show an installation for an application to a Stern Drive mounting and a variant of this mounting.

In these figures, the references are identical to that of the preceding embodiment that relates more particularly to a shaft line mounting but magnified by 200. The common elements of these two FIGS. 6 and 7 are identical.

Actually, the elements of the invention are strictly identical; only the designs are modified for integration with each type of mounting and in this case to that of the Stern Drive.

FIG. 6 shows the device 250 according to the invention, a clutch 306 mounted on the input shaft 252 with its splined part 255.

The output shaft 261 drives the coupling system SC known under the name "Boule de Gomme [Gumdrop]."

The device 250 according to the invention comprises a generator unit 276 with a rotor 278 and a stator 280.

The stator 280 is integral with the casing 272, while the rotor 278 is integral with the output shaft 261. The front plate 273 and the rear plate 274 are shown.

The bearings P1, P2, P3 and P4 are retained in the same places and for the same functions.

Likewise, the cooling circuit 298 is provided.

In FIG. 7, the references of the parts are kept the same, with only the structure being modified.

It is found that the device according to the invention can be directly transferred to any type of mounting, with just the knowledge of one skilled in the art.

The invention claimed is:

1. Electric current-generating and/or electric power-plant device (50) in a sailing structure comprising at least one power plant (12) and at least one battery pool (14, 16), whereby said power plant (12) comprises at least one heat engine (18), one reducer/inverter assembly (20), and particularly a shaft line (22) equipped with at least one propeller (24) at its end, with the current-generating device (50) being inserted between the flange (66) of the engine cover (68) of said engine (18), and the flange (70) of the reducer/inverter assembly (20), whereby said device (50) is characterized in that it takes the form of a closed module (64) that can be inserted directly between the flange (66) of the engine cover (68) and the flange (70) of the reducer/inverter assembly (20) without disassembly, total or partial, of its components.

2. Electric current-generating and/or electric power-plant device (50) in a sailing structure according to claim 1, wherein said module (64) comprises at least one casing (72) and a rear plate (74) enclosing at least one generator unit (76) composed of a rotor (78) and a stator (80), with said rear plate (74) being attached to and made integral with the casing (72), and wherein said stator (80) is integral with the casing (72), and the rotor (78) is connected to the input shaft (52) and to the splined hub (61) of the linking means (60) with the reducer/inverter assembly (20).

3. Electric current-generating and/or electric power-plant device (50) in a sailing structure according to claim 2, wherein the rotor (78) is connected securely, particularly by screws, to the input shaft (52) and to the splined hub (61) of the linking means (60).

4. Electric current-generating and/or electric power-plant device (50) in a sailing structure according to claim 2, wherein the rotor (78) is connected securely to the splined hub (61) of the linking means (60) and is coupled to the input shaft (52) by a clutch (106) that is integrated into the module (64).

5. Electric current-generating and/or electric power-plant device (50) in a sailing structure according to claim 4, wherein the clutch (106) comprises at least one clutch cover (108) that is connected securely to the rotor(s) (78, 78-1, 78-2) and to the splined hub (61), and a hub (110) carrying flyweights (112) connected securely to the input shaft (52), and the bearings P3 and P4 that ensure the support and the guiding in rotation of said cover (108) in relation to the flyweight-holding hub (110).

6. Electric current-generating and/or electric power-plant device (50) in a sailing structure according to claim 2, wherein the module (64) encloses two generator units (76-1, 76-2), each composed of a rotor (78-1, 78-2) and a stator (80-1, 80-2), with said module (64) comprising the casing (72) composed of a front plate (73), two braces (75-1, 75-2), and the rear plate (74), and wherein the stator (80-1) is integral with the brace (75-1), the stator (80-2) is integral with the brace (75-2), the rotors (78-1, 78-2) are connected securely to the splined hub (61) of the linking means (60) by an intermediate part (114), and the rotors (78-1, 78-2) are coupled to the input shaft (52) by a clutch (106) that is integrated into the module (64).

7. Electric current-generating and/or electric power-plant device (50) in a sailing structure according to claim 6, wherein the two generator units (76-1, 76-2) furnish the same or different voltages.

8. Electric current-generating and/or electric power-plant device (50) in a sailing structure according to claim 2, wherein said input shaft (52) is supported and guided in rotation by a bearing P1 mounted in a housing (102) provided at the center of the seat (82) of the casing (72), and wherein the splined hub (61) of the linking means (60) is supported and guided in rotation by a bearing P2 mounted in a housing (104) provided at the center of the rear plate (74).

9. Electric current-generating and/or electric power-plant device (50) in a sailing structure according to claim 2, wherein a cooling circuit (98, 98-1, 98-2) in the form of a channel (100, 100-1, 100-2) surrounding the stator (80, 80-1, 80-2) is integrated into the casing/brace (72, 75, 75-1, 75-2).

10. Electric current-generating and/or electric power-plant device (50) in a sailing structure according to claim 2, wherein the seat (82) of the casing (72) comprises fastening means (84) on the flange (66) of the engine cover (68), whereby the fastening means (84) are accessible from the outside of the module (64) and take the form of bores (86) made in the seat (82) of the casing (72), and wherein the rear plate (74) comprises receiving means (86) of the reducer/inverter assembly (20), whereby said receiving means (86) take the form of bores (90) distributed on a collar (92) on which rests the flange (70) that comprises bores (94) for the passage and the tightening from the outside of fastening screws (96).

11. Module (64) made according to claim 1.

* * * * *